(12) United States Patent
Takeuchi

(10) Patent No.: US 6,276,715 B1
(45) Date of Patent: Aug. 21, 2001

(54) SAFETY BELT DEVICE WITH AN INFLATABLE BELT

(75) Inventor: Hiroyuki Takeuchi, Tokyo (JP)

(73) Assignee: Takata Corporation, Tokyo (JP)

( * ) Notice: Subject to any disclaimer, the term of this patent is extended or adjusted under 35 U.S.C. 154(b) by 0 days.

(21) Appl. No.: 09/471,198

(22) Filed: Dec. 23, 1999

(30) Foreign Application Priority Data

Dec. 24, 1998 (JP) .................................. 10-367342

(51) Int. Cl.⁷ .................................................. B60R 21/18
(52) U.S. Cl. .................. 280/733; 280/728.1; 280/730.1; 280/808
(58) Field of Search .................. 280/733, 736, 280/741, 729, 742, 743.1, 728.1, 730.1, 803, 805, 806, 808

(56) References Cited

U.S. PATENT DOCUMENTS

| | | | |
|---|---|---|---|
| 3,888,503 | * 6/1975 | Hamilton | 280/150 |
| 3,933,370 | * 1/1976 | Abe et al. | 280/150 |
| 4,348,037 | * 9/1982 | Law et al. | 280/733 |
| 5,288,104 | 2/1994 | Chen | 280/733 |
| 5,303,953 | * 4/1994 | Kamiyama et al. | 280/733 |
| 5,466,002 | 11/1995 | Tanaka et al. | 280/733 |
| 5,870,816 | * 2/1999 | McFalls et al. | 29/434 |
| 5,947,513 | * 9/1999 | Lehto | 280/733 |
| 6,059,311 | * 5/2000 | Wipasuramonton et al. | 280/729 |
| 6,082,763 | * 7/2000 | Kokeguchi | 280/733 |
| 6,116,637 | * 9/2000 | Takeuchi et al. | 280/733 |
| 6,126,194 | * 10/2000 | Yaniv et al. | 280/733 |
| 6,189,921 | * 2/2001 | Takeuchi | 280/733 |

FOREIGN PATENT DOCUMENTS

| | | | |
|---|---|---|---|
| 4211209A1 | * 7/1993 | (DE) | 280/733 |
| 0901945 A2 | 3/1999 | (EP) | 21/18 |
| 5-85301 | 4/1993 | (JP) . | |
| 6-64493 | * 6/1993 | (JP) | 280/733 |

* cited by examiner

Primary Examiner—J. J. Swann
Assistant Examiner—J. Allen Shriver
(74) Attorney, Agent, or Firm—Foley and Lardner

(57) ABSTRACT

A seat belt device has a tongue and a buckle of simple structures. The seat belt device has an inflatable belt that extends from a shoulder belt. An inflator is actuated to supply gas into the inflatable belt to inflate the inflatable belt. The inflatable belt also extends across the chest along with the shoulder belt. When the inflatable belt is inflated, the length of the inflatable belt is shortened in the longitudinal direction so that the shoulder belt and the lap belt operably connected thereto are tensioned by the inflated belt. Therefore, the shoulder belt and the lap belt are tightened to securely hold the occupant in the vehicle seat.

12 Claims, 4 Drawing Sheets

SAFETY BELT DEVICE WITH AN INFLATABLE BELT

BACKGROUND OF THE INVENTION

1. Field of the Invention

The present invention relates to a seat belt device for protecting an occupant on a vehicle in a vehicle collision and, particularly, to an inflatable belt device wherein a part of the seat belt is in a shape of an envelope and inflatable with gas from a gas generator.

2. Description of the Related Art

This type of inflatable belt device is previously known, for example, as disclosed in Unexamined Japanese Patent Publication No. H5-85301. FIG. 4 is a general perspective view of the inflatable belt device disclosed in this publication.

This inflatable belt device 1 comprises an inflatable belt 2b extending diagonally from the right side to the left side of the upper half of an occupant's body, a shoulder belt 2a connected to the inflatable belt 2b, a lap belt 3 extending from the right side to the left side of the occupant's waist, a buckle 4 arranged, for example, at a floor of a vehicle body, a tongue 5, which is inserted into and engaged with the buckle 4 when the vehicle occupant wears the seat belt, and a deflector fitting 6 for guiding the shoulder belt 2a.

The shoulder belt 2a comprises a normal webbing 2, which is the same as a typical conventional seat belt. The proximal end of the shoulder belt is connected to a seat belt retractor 7 with an emergency locking mechanism (ELR) which is fixed to the vehicle body. The shoulder belt 2a is arranged in such a manner as to be wound into the seat belt retractor 7.

The inflatable belt 2b is positioned to be in front of the chest of the occupant, and is connected to the tongue 5 at an end opposite to the end connected to the webbing 2a.

The lap belt 3 is composed of a normal webbing which is the same as a typical conventional seat belt, of which one end is connected to the tongue 5 and the other end is connected to a seat belt retractor (ELR) 8, which is fixed to the vehicle body. Further, connected to the buckle 4 is a gas generator 9, which is actuated in case of emergency such as a vehicle collision to generate high-pressure gas.

The tongue 5 and the buckle 4 are provided with passages for introducing gas from the gas generator 9 into the inflatable belt 2b. When the gas generator 9 is actuated, the gas is introduced into the inflatable belt 2b through this passages so that the inflatable belt 2b is inflated.

In the aforementioned conventional inflatable belt device, both the tongue 5 and the buckle 4 are required to have the passages for introducing gas, making the tongue 5 and the buckle 4 expensive compared to a tongue and a buckle of a normal seat belt device.

SUMMARY OF THE INVENTION

It is an object of the present invention to provide an inflatable belt device of which a tongue and a buckle have simple structures.

An inflatable belt device of the present invention comprises: an inflatable belt which is inflatable and which is arranged to extend diagonally on the upper half of an occupant's body; a gas generator for supplying gas into the inflatable belt through an upper end of the inflatable belt; a shoulder belt which is connected, at a distal end thereof, to a lower end of the inflatable belt in the longitudinal direction; a first retractor for winding up a lower end portion of the shoulder belt; an intermediate member having an opening through which the shoulder belt is passed; a lap belt of which an distal end is connected to the intermediate guide; a second retractor for winding up a lower end portion of the lap belt; and a tongue which the lap belt is passed.

In the aforementioned inflatable belt device, gas is supplied into the inflatable belt through its upper end, thereby eliminating the provision of gas supplying means in the tongue and the buckle. This simplifies the structure of the tongue and the buckle.

In the inflatable belt device of the present invention, when the inflatable belt is inflated, the length of the inflatable belt is shortened in the longitudinal direction as compared to that before the inflation. As a result of this, tension is applied on the shoulder belt and the lap belt according to the inflation of the inflatable belt, thereby securely restraining the occupant in the vehicle seat.

To allow the shoulder belt connected to the inflatable belt to be smoothly passed through the opening of the intermediate member, the intermediate member may be provided with a roller for guiding the shoulder belt which is disposed on an edge of the opening of the intermediate member. Similarly, the tongue may be provided with a roller for guiding the lap belt which is disposed on an edge of the opening of the tongue. The inflatable belt may be provided with a stopper for preventing the inflatable belt from entering through the opening of the intermediate member In the present invention, a deflection fitting may be disposed on the way of the shoulder belt. The deflection fitting is fixed to a pillar or a seat back of a vehicle body.

In the present invention, a mounting plate may be connected to the upper end of the inflatable belt in the longitudinal direction and may be fixed to the pillar or the seat back of the vehicle body. In this case, a pipe for introducing gas from the gas generator into the inflatable belt may be supported by the mounting plate. This structure facilitates the installation of the pipe and the gas generator.

DETAILED DESCRIPTION OF THE PREFERRED EMBODIMENT

Figure 1:
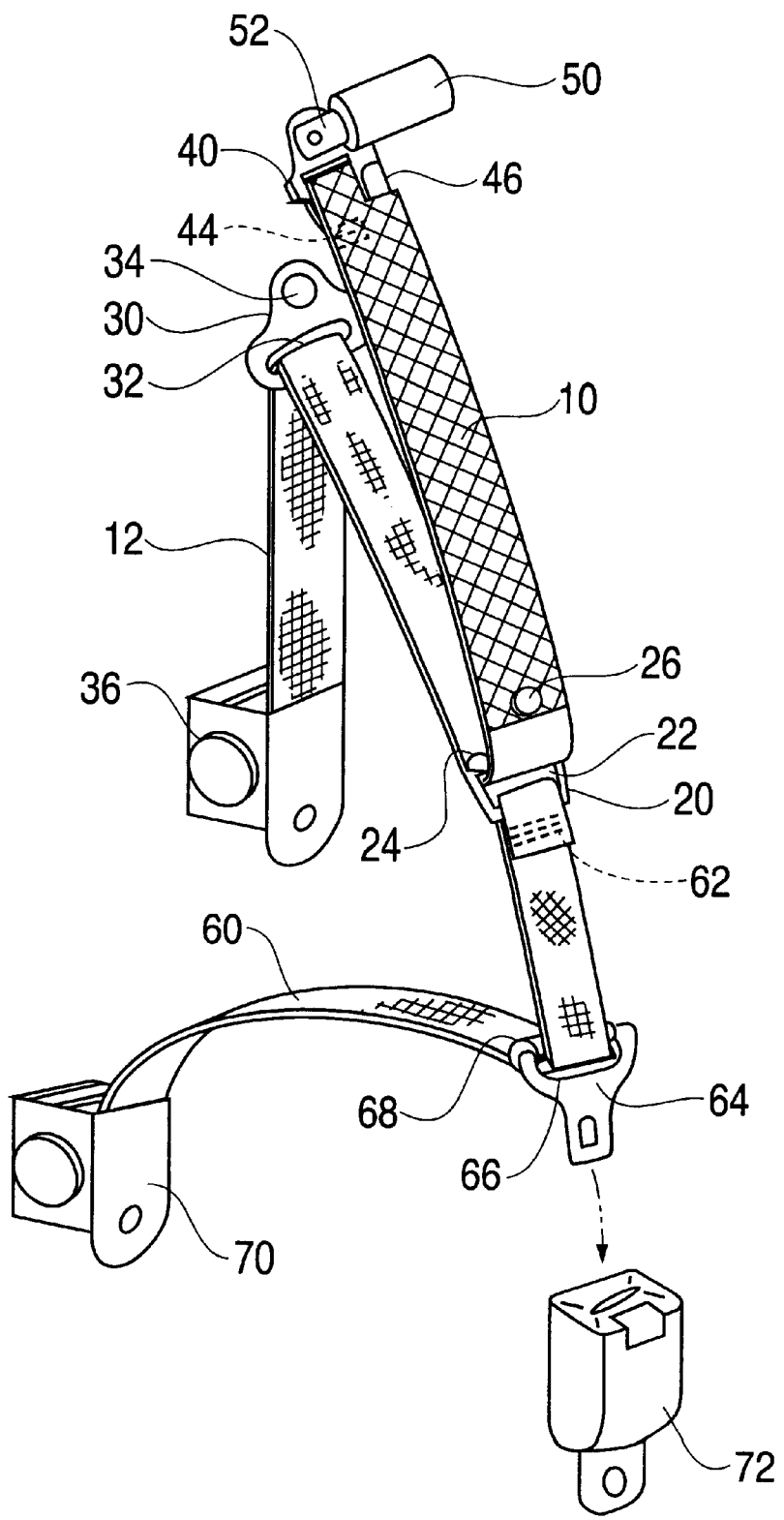
FIG. 1 is a perspective view of an inflatable belt device according to an embodiment of the present invention.
Figure 2:
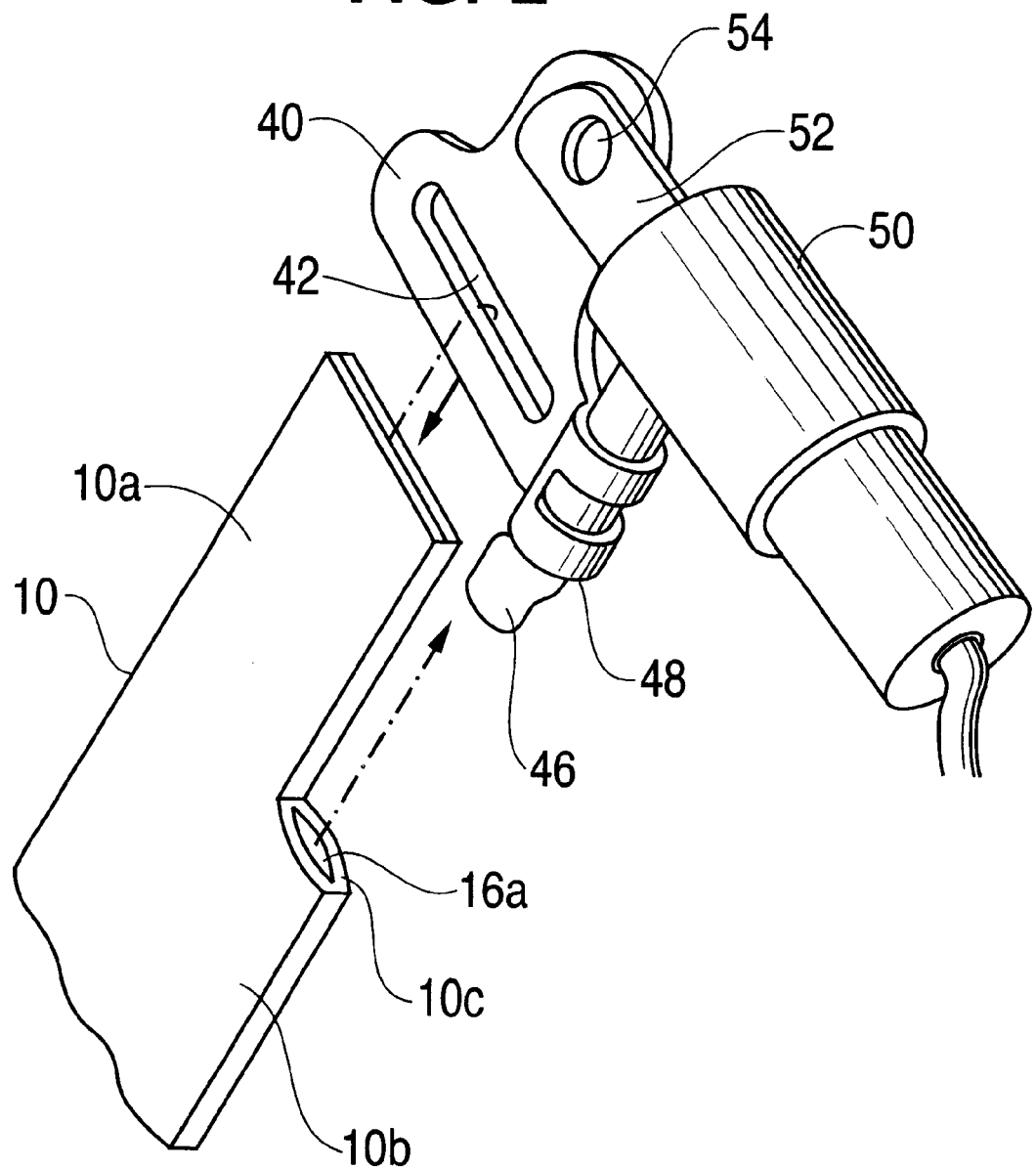
FIG. 2 is an exploded perspective view showing main components of the inflatable belt device according to the embodiment of FIG. 1.
Figure 3A:
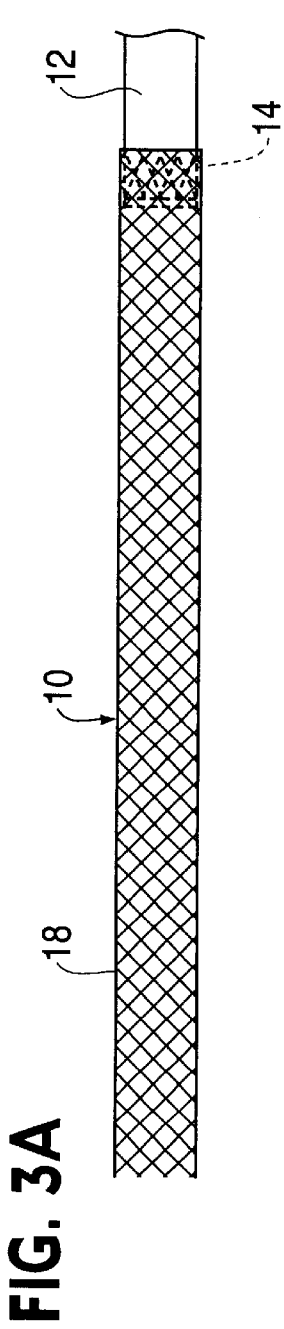
FIGS. 3(a)–3(c) are structural views showing parts around the joint between an inflatable belt and a shoulder belt of the embodiment of FIG. 1.
Figure 3B:
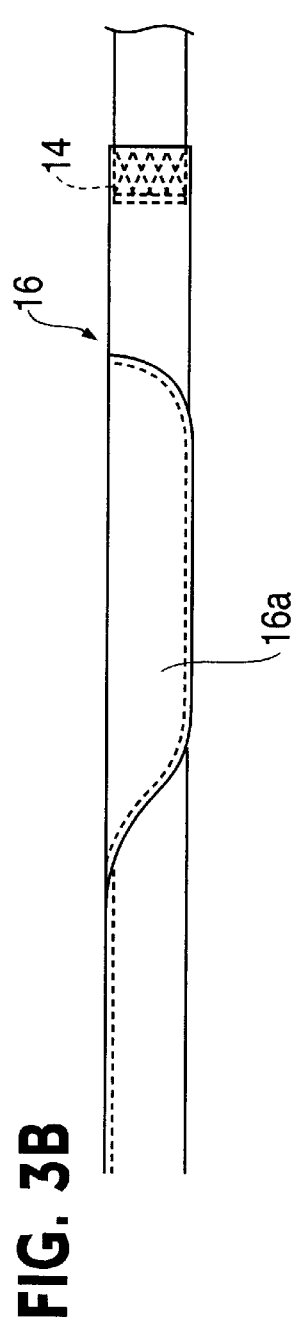
Figure 3C:
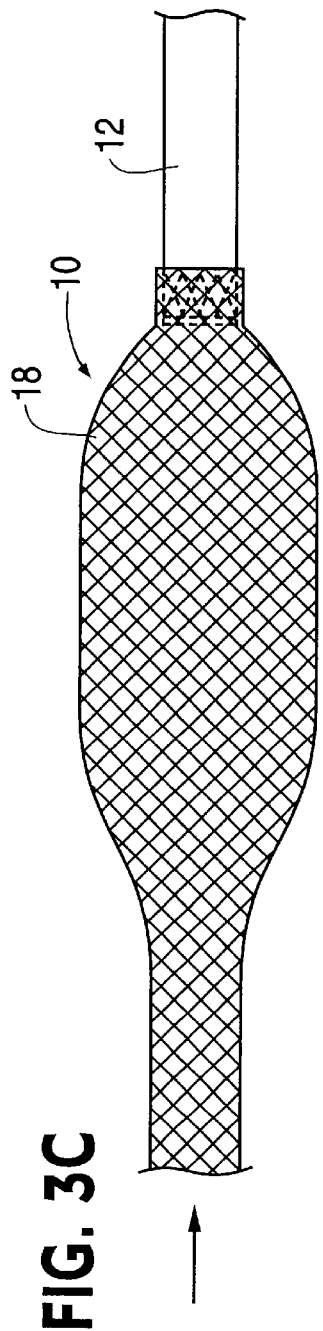
Figure 4:
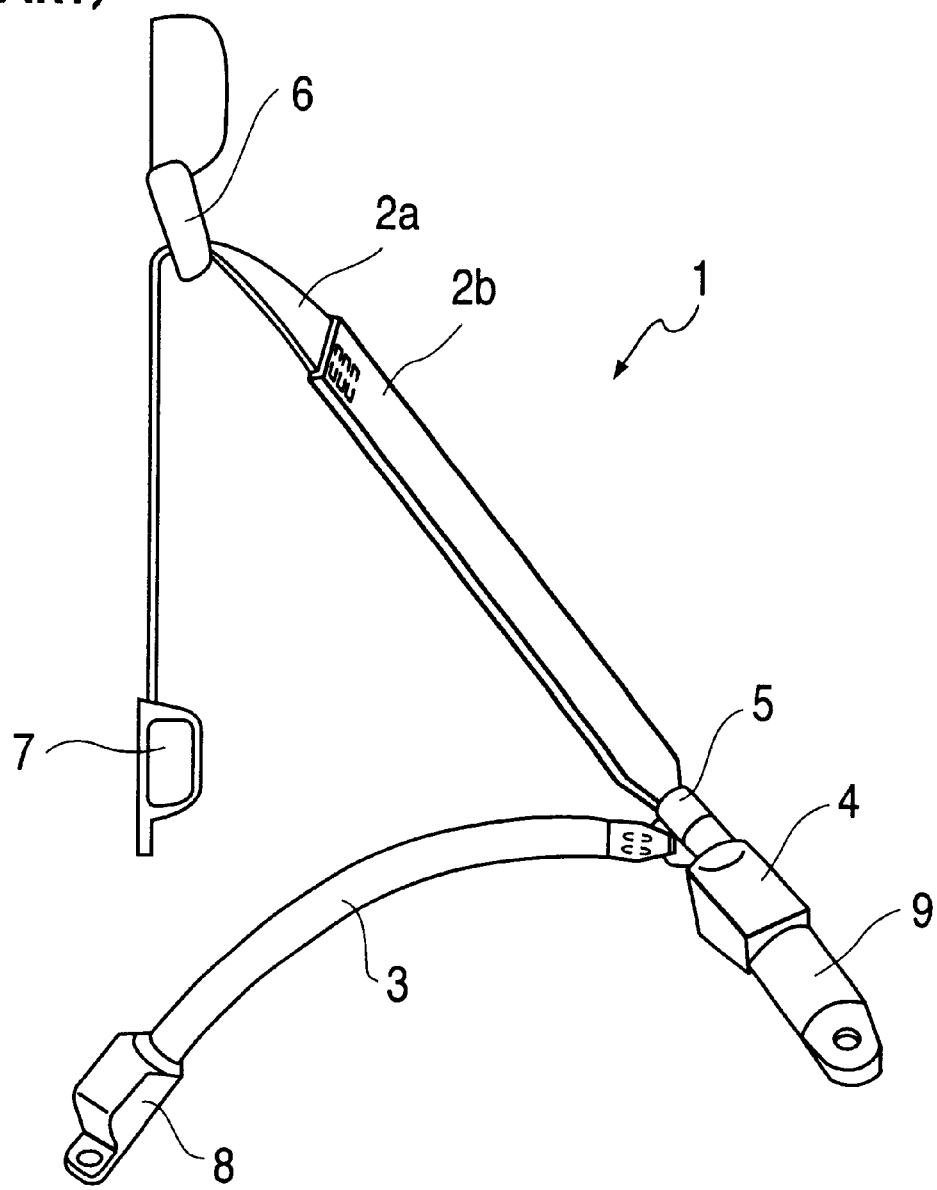
FIG. 4 is perspective view showing a conventional inflatable belt.

Hereinafter, an embodiment of the present invention will be described with reference to the attached drawings. FIG. 1 is a perspective view of an inflatable belt device according to the embodiment, FIG. 2 is a exploded perspective view showing an upper portion of the inflatable belt device, FIG. 3(a) is a front view of a portion around the joint between the inflatable belt and a shoulder belt, FIG. 3(b) is a front view of an envelope-like belt, and FIG. 3(c) is a front view showing the inflatable belt and the shoulder belt in the state that the inflatable belt is inflated.

When a vehicle occupant wears the inflatable belt 10, the inflatable belt 10 extends diagonally on the upper half of the occupant's body, in this embodiment, to extend from a portion on the right side of the occupant's head to the occupant's left waist.

The lower end of the inflatable belt 10 is connected to the distal end of the shoulder belt 12 by sewing. Numeral 14 in FIG. 3(a) designates stitches of this sewing. The shoulder belt 12 is made of the same material as that of a webbing of the normal seat belt device.

The inflatable belt 10 comprises an envelope-like belt 16 and a cylindrical knit cover 18 made of fabric surrounding the envelope-like belt 16. The envelope-like belt 16 comprises a portion 16a which corresponds to a range from the chest to the waist of the occupant sitting on the vehicle seat and which has an expanded configuration. This expanded portion 16a is folded into an elongated band shape as shown in FIG. 3(b).

The knit cover 18 is supplely stretchable in the width direction, but is hard to stretch in the longitudinal direction. This characteristic of the knit cover 18 is made, for example, by heat-stretching process.

As gas is supplied into the inflatable belt 10 to inflate the inflatable belt 10, the length of the inflatable belt 10 is shortened in the longitudinal direction. FIG. 3(c) shows the state that the inflatable belt 10 has shortened length. As described above, the knit cover 18 has been processed by heat-stretching process whereby the knit cover 18 is hard to stretch in the longitudinal direction. Therefore, when the envelope-like belt 16 is inflated, the stitches of the knit cover 18 are elongated in the width direction with the result that the length of the knit cover 18 is shortened in the longitudinal direction, shortening the length of the inflatable belt 10.

The shoulder belt 12 is passed through an opening 22 of a rectangular ring 20. The ring 20 is provided with a guide roller 24. The shoulder belt 12 is hooked by the guide roller 24 and is therefore folded at the guide roller. Disposed on the joint of the inflatable belt 10 and the shoulder belt 12 is a stopper 26 for preventing the inflatable belt 10 from passing through the opening 22 of the ring 20. The stopper 26 is composed of a small block, for example, a button made of synthetic resin.

The shoulder belt 12 is introduced upwardly and is inserted into an opening 32 of a deflection fitting 30. From the deflection fitting 30, the shoulder belt 12 is introduced downwardly and is retractably connected to a shoulder belt retractor 36. The deflection fitting 30 is attached to a pillar of the vehicle by a bolt 34.

The inflatable belt 10 has a narrow portion 10a disposed at the upper end thereof. The inflatable belt 10 is connected to a mounting plate 40 (FIG. 2) by inserting the narrow portion 10a through a slot-shaped opening 42 of the mounting plate 40, folding the narrow portion 10a at the slot-shaped opening 42, and sewing up the superposed portions. Numeral 44 of FIG. 1 designates a sewing yarn.

A step 10c is formed between the narrow portion 10a and a wide portion 10b of the inflatable belt 10. A gas inlet 16a of the envelope-like belt 16 is exposed on the step 10c.

The mounting plate 40 has a C-shaped pipe holder 48 like a claw, which is disposed on the side thereof and whereby a pipe 46 is held. The pipe 46 is for sending gas of an inflator (gas generator) 50 into the envelope-like belt 16. The proximal end of the pipe 46 is connected to the inflator 50 and the distal end of the pipe 46 is inserted into the gas inlet 16a.

A cover mold made of synthetic resin may be employed to cover a range around the upper end of the inflatable belt 10 with the pipe 46.

The inflator 50 is provided with a bracket 52, which is superposed on the mounting plate 40. The mounting plate 40 and the bracket 52 have bolt holes 54, respectively, through which a bolt is inserted. By this bolt, the mounting plate 40 and the inflator 50 are fixed to the pillar of the vehicle.

Also connected to the ring 20 is the distal end of the lap belt 60. The lap belt 60 is connected to the ring 20 by inserting the distal end of the lap belt 60 through the opening 22 of the ring 20, folding the distal end at the opening 22 to superpose on the lap belt 60, and sewing the superposed portions. Numeral 62 of FIG. 1 designates a sewing yarn for this sewing.

The lap belt 60 is passed through an opening 66 of the tongue 64. The tongue 64 is provided with a guide roller 68 for guiding the lap belt 60. The proximal end of the lap belt 60 is retractably connected to a retractor 70 for the lap belt. The tongue 64 is engageable with the buckle 72.

In the inflatable belt device structured as mentioned above, the tongue 64 is engageable with the buckle 72 to protect the vehicle occupant. When the inflator 50 is not actuated, the inflatable belt device exhibits the same function of the normal seat belt device.

When the vehicle comes in collision at a speed exceeding a predetermined value, the inflator 50 is actuated to supply gas into the inflatable belt 10, thereby inflating the inflatable belt 10. The inflatable belt 10 which is inflated extends from the right side of the occupant's head and along the chest and waist of the occupant, thereby protecting the occupant enough. When the inflatable belt 10 is inflated, the length of the inflatable belt 10 is shortened in the longitudinal direction so that the shoulder belt 12 and the lap belt 60 are pulled by the inflatable belt 10. Therefore, the shoulder belt 12 and the lap belt 60 are tightened, thereby securely holding the occupant in the vehicle seat.

Since the guide rollers 24, 68 are provided in this embodiment, the tension of the inflatable belt 10 is smoothly transmitted to the shoulder belt 12 and the lap belt 60.

Though the rectangular frame-like ring 20 is employed as an intermediate member in the above embodiment, a plate having an opening may be employed instead of the ring 20.

Though the deflection fitting 30 and the mounting plate 40 are fixed to the pillar of the vehicle in the above embodiment, these may be fixed to a seat back of a vehicle seat.

Though the pipe 46 is employed in the above embodiment, the inflator may be arranged within the inflatable belt.

As described above, the inflatable belt device of the present invention is adapted so that gas from the gas generator is introduced into the inflatable belt through the upper end of the inflatable belt, thereby simplifying the structure of the tongue and the buckle. According to the present invention, the lap belt and the shoulder belt may be tightened by tension applied to the inflatable belt when inflated.

The priority document here, Japanese patent application number 10-367342, filed Dec. 24, 1998, is hereby incorporated by reference.

What is claimed:

1. An inflatable belt device comprising:
   an inflatable belt which is inflatable and which is arranged to extend diagonally on an upper half of an occupant's body;
   a gas generator for supplying gas into the inflatable belt through an upper end of the inflatable belt;

a shoulder belt which is connected, at a distal end thereof, to a lower end of the inflatable belt in a longitudinal direction;

a first retractor for winding up a lower end portion of the shoulder belt;

an intermediate guide having an opening through which the shoulder belt is passed;

a lap belt, discrete from the shoulder belt, having a distal end connected to the intermediate guide;

a second retractor for winding up a lower end portion of the lap belt; and a tongue through which the lap belt is passed.

2. An inflatable belt device according to claim 1, wherein the inflatable belt is provided with a stopper for preventing the inflatable belt from entering through the opening of the intermediate guide.

3. An inflatable belt device according to claim 1, further comprising a deflection fitting having an opening through which the shoulder belt is passed.

4. An inflatable belt device according to claim 1, further comprising a mounting plate to which the upper end of the inflatable belt in the longitudinal direction is connected, and a pipe for introducing gas from the gas generator into the inflatable belt, wherein the pipe is supported by the mounting plate.

5. An inflatable belt device according to claim 4, wherein said gas generator is supported by said mounting plate.

6. An inflatable belt device according to claim 1, wherein said intermediate guide is provided with a rotatable roller for guiding said shoulder belt, said rotatable roller being disposed on an edge of the opening of said intermediate guide.

7. An inflatable belt device according to claim 1, wherein the tongue is provided with a rotatable roller for guiding said lap belt, said rotatable roller being disposed on an edge of the opening of said tongue.

8. A seat belt device comprising:

an inflatable belt adapted to extend across an occupant's chest;

a gas generator for supplying gas into the inflatable belt through an upper end of the inflatable belt;

a shoulder belt extending from a lower end of the inflatable belt and adapted to extend across the occupant's chest;

a first retractor for retracting the shoulder belt and thus the inflatable belt;

an intermediate guide having an opening, the shoulder belt extending through the intermediate guide opening;

a lap belt, discrete from the shoulder belt, connected to the intermediate guide;

a second retractor for separately retraction lap belt; and a tongue having an opening, the lab belt extending through the tongue opening.

9. A seat belt device according to claim 8, further including a deflection fitting having an opening, the shoulder belt extending through the deflection fitting opening.

10. A seat belt device according to claim 9, further including a mounting plate to which the upper end of the inflatable belt and the gas generator are connected, and a pipe extending from the gas generator to the inflatable belt for introducing gas from the gas generator into the inflatable belt.

11. A seat belt device according to claim 8, wherein the intermediate guide is provided with a rotatable roller for guiding the shoulder belt.

12. A seat belt device according to claim 8, wherein the tongue is provided with a rotatable roller for guiding the lap belt.

* * * * *